(12) United States Patent
Xiao et al.

(10) Patent No.: US 11,905,221 B2
(45) Date of Patent: Feb. 20, 2024

(54) DISPERSANT FOR PREMIXED FLUIDIZED SOLIDIFIED SOIL, PREPARATION METHOD AND APPLICATION THEREOF

(71) Applicants: WUHAN INSTITUTE OF TECHNOLOGY, Wuhan (CN); The College of Post and Telecommunication of WIT, Wuhan (CN)

(72) Inventors: Zunqun Xiao, Wuhan (CN); Caiyun Xu, Wuhan (CN); Hui Wang, Wuhan (CN); Fuqi Wang, Wuhan (CN); Zhentao Lv, Wuhan (CN); Yanbin Chang, Wuhan (CN); Haitao Liu, Wuhan (CN); Yinlei Shi, Wuhan (CN); Keqi Luo, Wuhan (CN); Jian Lin, Wuhan (CN); Minghui Deng, Wuhan (CN); Puyu Li, Wuhan (CN); Yuepeng Zheng, Wuhan (CN)

(73) Assignees: WUHAN INSTITUTE OF TECHNOLOGY, Wuhan (CN); THE COLLEGE OF POST AND TELECOMMUNICATION OF WIT, Wuhan (CN)

( * ) Notice: Subject to any disclaimer, the term of this patent is extended or adjusted under 35 U.S.C. 154(b) by 0 days.

(21) Appl. No.: 18/316,229

(22) Filed: May 11, 2023

(65) Prior Publication Data
US 2024/0018058 A1 Jan. 18, 2024

(30) Foreign Application Priority Data
Jul. 14, 2022 (CN) .......................... 202210825685.8

(51) Int. Cl.
| | | |
|---|---|---|
| C04B 40/00 | (2006.01) | |
| C04B 22/16 | (2006.01) | |
| C04B 24/16 | (2006.01) | |
| C04B 28/00 | (2006.01) | |
| C04B 103/40 | (2006.01) | |
| C04B 103/30 | (2006.01) | |
| C04B 103/32 | (2006.01) | |

(52) U.S. Cl.
CPC .......... *C04B 40/0039* (2013.01); *C04B 22/16* (2013.01); *C04B 24/16* (2013.01); *C04B 28/001* (2013.01); *C04B 2103/302* (2013.01); *C04B 2103/32* (2013.01); *C04B 2103/408* (2013.01)

(58) Field of Classification Search
CPC ..... C04B 40/0039; C04B 22/16; C04B 24/16; C04B 28/001; C04B 2103/302; C04B 2103/32; C04B 2103/408
See application file for complete search history.

(56) References Cited

U.S. PATENT DOCUMENTS

| | | |
|---|---|---|
| 6,228,833 B1 | 5/2001 | Paatz et al. |
| 11,214,763 B2 | 1/2022 | Lo et al. |
| 11,377,628 B2 | 7/2022 | Lo et al. |

FOREIGN PATENT DOCUMENTS

| | | |
|---|---|---|
| CN | 102786245 A | 11/2012 |
| CN | 105924026 A | 9/2016 |
| CN | 109133785 A | 1/2019 |
| CN | 109704619 A | 5/2019 |
| CN | 110157446 A | 8/2019 |
| CN | 112142406 A | 12/2020 |
| CN | 113264731 A | 8/2021 |
| CN | 113651550 A | 11/2021 |
| CN | 114106848 A | 3/2022 |
| JP | 2004358456 A | 12/2004 |

*Primary Examiner* — Anthony J Green
(74) *Attorney, Agent, or Firm* — True Shepherd LLC; Andrew C. Cheng

(57) ABSTRACT

A dispersant for premixed fluidized solidified soil includes the following raw materials in parts by weight: 5 parts to 15 parts of an anti-adhesion water reducer, 0.5 parts to 0.8 parts of a stabilizer, and 85 parts to 95 parts of water. The anti-adhesion water reducer is compounded by an inorganic dispersant and an aminosulfonic acid-based superplasticizer (ASP), and the inorganic dispersant is at least one selected from the group consisting of sodium silicate, sodium hexametaphosphate, and sodium pyrophosphate. In the present disclosure, on the premise of improving fluidity of mucky cohesive soil slurry, a strength of the fluidized solidified soil at each stage is adjusted through a water-reducing effect of the anti-adhesion water reducer. Moreover, rapid dispersion of the mucky cohesive soil slurry is realized, thus providing key technical support for preparation of the premixed fluidized solidified soil from undisturbed soil in non-dry conditions.

6 Claims, No Drawings

DISPERSANT FOR PREMIXED FLUIDIZED SOLIDIFIED SOIL, PREPARATION METHOD AND APPLICATION THEREOF

CROSS-REFERENCE TO RELATED APPLICATIONS

This application claims priority to Chinese Patent Application No. 202210825685.8 with a filing date of Jul. 14, 2022. The content of the aforementioned application, including any intervening amendments thereto, is incorporated herein by reference.

TECHNICAL FIELD

The present disclosure relates to the technical field of engineering materials, in particular to a dispersant for premixed fluidized solidified soil, and a preparation method and application thereof.

BACKGROUND

Premixed fluidized solidified soil is widely used in backfilling projects of foundation pits, roadbeds, and underground pipe galleries. The premixed fluidized solidified soil is made from silt, peat, or mucky cohesive soil through a special solidifying agent and a special mixing process. The existing fluidized solidified soil is obtained by drying, crushing, and sieving the mucky cohesive soil. These procedures have high construction cost and long construction period, thereby greatly limiting the applications of the fluidized solidified soil. The key to achieving wider application of the premixed fluidized solidified soil is to realize in-situ production of the premixed fluidized solidified soil on a basis of the mucky cohesive soil. The in-situ mucky cohesive soil has poor fluidity. During the mixing, cohesive soil particles are easily adsorbed on the blades of a rotating shaft of the mixing equipment, thus forming "mud balls" on the blades. This may in turn lead to an inability of the solidifying agent to fully mix with the mucky cohesive soil, to form the premixed fluidized solidified soil that meets pouring requirements. Therefore, it is of great importance to realize the production of premixed fluidized solidified soil under non-dry conditions by finding a suitable technical solution to solve the fluidity of mucky cohesive soil during the production.

Chinese Patent Application CN113651550A disclosed a dispersant including an adhesion-reducing dispersing component, an infiltrating dispersing component, and an enveloping dispersing component. A solution of the dispersant is used in combination with a foaming agent. In this patent, the combination of the dispersant and the foaming agent has rapid penetration, adsorption, and decomposition effects on clay particles. Alternatively, improvement is conducted on the prior art. By improving the compressibility of cohesive soil, the "mud cake" formed by a cutter head can be avoided during the construction by a shield tunneling machine in a cohesive soil layer.

At present, there is no research specifically on dispersants in preparing the premixed fluidized solidified soil using mucky cohesive soil under non-dry conditions. The mucky cohesive soil has high moisture content, strong viscosity, high organic matter content, low permeability, and strong adsorption force of clay particles on a metal surface of the stirring equipment. Before adding special solidifying materials, it is necessary to disperse and liquefy the mucky cohesive soil to form a suspension slurry of the mucky cohesive soil. The special solidifying materials are then added, thus full mixing the special solidifying materials with the suspension slurry of the mucky cohesive soil. In this way, the premixed fluidized solidified soil is prepared, and meets the fluidity requirements of pouring. Through researches, it is found that three problems must be solved to realize the above process. 1) The adsorption force of the cohesive soil particles should be reduced on a surface of the blades of the rotating shaft, and the ineffective stirring space should also be reduced. 2) A bond strength between the microscopic particles of the mucky cohesive soil must be eliminated, thereby improving a dispersion efficiency of mucky cohesive soil. 3) The water consumption of the mucky cohesive soil slurry should be reduced, so as to meet the groutability requirements while ensuring a strength of the premixed fluidized solidified soil.

SUMMARY OF PRESENT INVENTION

To overcome the deficiencies of the prior art, the present disclosure aims to provide a dispersant for premixed fluidized solidified soil, and a preparation method and application thereof. The present disclosure intends to solve the technical problems in the prior art that the fluidized solidified soil needs to be obtained by drying, crushing, and sieving the mucky cohesive soil, thus resulting in high construction cost and long construction period.

In one aspect, the present disclosure provides a dispersant for premixed fluidized solidified soil, including the following raw materials in parts by weight: 5 parts to 15 parts of an anti-adhesion water reducer, 0.5 parts to 0.8 parts of a stabilizer, and 85 parts to 95 parts of water; where the anti-adhesion water reducer is compounded by an inorganic dispersant and an aminosulfonic acid-based superplasticizer (ASP), and the inorganic dispersant is at least one selected from the group consisting of sodium silicate, sodium hexametaphosphate, and sodium pyrophosphate.

In another aspect, the present disclosure provides a preparation method of the dispersant for premixed fluidized solidified soil, including the following steps: mixing the anti-adhesion water reducer, the stabilizer, and water uniformly to obtain the dispersant for premixed fluidized solidified soil.

In yet another aspect, the present disclosure provides an application of the dispersant for premixed fluidized solidified soil in in-situ preparation of the premixed fluidized solidified soil using mucky cohesive soil.

The main technical principles of the present disclosure are as follows:

The inorganic dispersant has low cost but poor dispersion effect. The inorganic dispersant can ionize in the slurry, thereby thickening an electric double layer. In this way, a repulsive force between the particles is improved, thereby improving fluidity of the slurry. A structure of the ASP has hydrophilic branched chains, which extend into an aqueous solution, thereby forming a hydrophilic three-dimensional adsorption layer with a certain thickness on a surface of adsorbed cement particles. When clay particles approach, adsorption layers begin to overlap, and create steric hindrance between the clay particles. The more overlapping occurs, the greater the steric repulsion is, leading to greater hindrance to the cohesion between clay particles. This keeps a desirable slump of the premixed fluidized solidified soil. In the present disclosure, the anti-adhesion water reducer is compounded with the inorganic dispersant and the ASP. The ASP can prevent particle agglomeration, and the inorganic dispersant can improve the fluidity of the slurry, such that the dispersant has desirable cost performance, better dispersion effect, and higher efficiency.

In the suspension slurry of the mucky cohesive soil, clay particles and water have three binding modes: firmly-bound water, loosely-bound water, and free water. The firmly-bound water and the loosely-bound water are regularly-arranged and irregularly-arranged water layers adsorbed on the surface of clay particles, respectively; and the free water is water adsorbed by hydration cations. Most of the free water is wrapped in "flocs", and the lack of free water leads to a higher viscosity of the mucky cohesive soil slurry. The anti-adhesion water reducer in the dispersant can release the free water in the "flocs", such that the slurry has higher fluidity even at a lower water content. In this way, the strength of the prepared fluidized solidified soil is improved. In addition, the stabilizer in the dispersant can improve wear resistance of the cutter and prevent corrosion of the cutter.

Compared with the prior art, the present disclosure has the following beneficial effects:

In the present disclosure, main influencing factors affecting the formation of mucky cohesive soil slurry are fully considered. Meanwhile, the bonding of the particles and the metal surface of the blades of the rotating shaft, the dispersion of the particles of the mucky cohesive soil, and the release of free water in the phantom of the mucky cohesive soil are avoided, thereby achieving full mixing of the soil. On the premise of improving fluidity of mucky cohesive soil slurry, a strength of the fluidized solidified soil at each stage is adjusted through a water-reducing effect of the anti-adhesion water reducer. Moreover, rapid dispersion of the mucky cohesive soil slurry is realized, thus providing a key technical support for a construction process of preparing the premixed fluidized solidified soil from undisturbed soil under non-dry conditions.

In the present disclosure, the dispersant has high dispersion speed, low corrosion, water reduction properties, and desirable stability. The dispersant is used to disperse and disintegrate the "flocculation block" of cohesive particles in the mucky cohesive soil. The dispersant can effectively avoid mud balls formed on the blades of the stirring equipment during the preparation of the premixed fluidized solidified soil using mucky cohesive soil, thereby rapidly forming a suspension slurry under mechanical stirring. This realizes the fluidity requirements of the mucky cohesive soil in preparing the premixed fluidized solidified soil, and then fully mixes the special solidifying agent added later with the slurry. In this way, a premixed fluidized solidified soil product is produced to meet the requirements of pouring fluidity and strength.

In the present disclosure, the dispersant has a low dosage, thereby reducing a production cost of the premixed fluidized solidified soil. This is conducive to expanding the market promotion of a construction technology for making the fluidized solidified soil using mucky cohesive soil.

DETAILED DESCRIPTION OF THE EMBODIMENTS

To make the objective, technical solutions and advantages of the present disclosure clearer, the present disclosure will be further described below in detail below with reference to the examples. Understandably, the specific examples described herein are merely intended to explain the present disclosure but not to limit the present disclosure.

A first aspect of the present disclosure provides a dispersant for premixed fluidized solidified soil, including the following raw materials in parts by weight: 5 parts to 15 parts of an anti-adhesion water reducer, 0.5 parts to 0.8 parts of a stabilizer, and 85 parts to 95 parts of water. The anti-adhesion water reducer is compounded by an inorganic dispersant and an ASP.

The inorganic dispersant is at least one selected from the group consisting of sodium silicate, sodium hexametaphosphate, and sodium pyrophosphate, preferably the sodium pyrophosphate. During the test, it was unexpectedly found that the anti-adhesion water reducer compounded by the sodium pyrophosphate and the ASP at a weight ratio of 2:1 is more conducive to exerting its synergistic effect, thereby significantly improving the fluidity of the in-situ mucky cohesive soil slurry and the strength of the prepared fluidized solidified soil.

In the present disclosure, the stabilizer is a phosphite.

Preferably, the dispersant for premixed fluidized solidified soil includes the following raw materials in parts by weight: 6 parts to 12 parts of the anti-adhesion water reducer, 0.6 parts of the stabilizer, and 87.4 parts to 93.4 parts of water.

More preferably, the dispersant for premixed fluidized solidified soil includes the following raw materials in parts by weight: 7.5 parts to 10.5 parts of the anti-adhesion water reducer, 0.6 parts of the stabilizer, and 88.9 parts to 91.9 parts of water.

More preferably, the dispersant for premixed fluidized solidified soil includes the following raw materials in parts by weight: 9 parts of the anti-adhesion water reducer, 0.6 parts of the stabilizer, and 90.4 parts of water.

A second aspect of the present disclosure provides a preparation method of the dispersant for premixed fluidized solidified soil, including the following steps: mixing the anti-adhesion water reducer, the stabilizer, and water uniformly to obtain the dispersant for premixed fluidized solidified soil.

In the present disclosure, the anti-adhesion water reducer, the stabilizer, and water are uniformly mixed at a room temperature.

A third aspect of the present disclosure provides an application of the dispersant for premixed fluidized solidified soil in in-situ preparation of the premixed fluidized solidified soil using mucky cohesive soil.

In the present disclosure, the in-situ preparation of the premixed fluidized solidified soil using mucky cohesive soil includes:

mixing the mucky cohesive soil with the dispersant uniformly to obtain an improved mucky cohesive soil slurry; and mixing the improved mucky cohesive soil slurry uniformly with a solidifying agent, and conducting molding, primary curing, demolding, and secondary curing to obtain the premixed fluidized solidified soil.

In the present disclosure, the dispersant is used at 4 mass % to 8 mass %, preferably 6 mass % of the mucky cohesive soil.

In the present disclosure, the solidifying agent is a conventional solidifying agent in the field, and those skilled in the art can select a solidifying agent according to the actual situation without limitation. Further, the solidifying agent is used at 10 mass % to 30 mass %, preferably 20 mass % of the improved mucky cohesive soil slurry.

In the present disclosure, the primary curing is conducted at 20° C. to 30° C., further 25° C. and a relative humidity of 80% to 90%, further 90% for 36 h to 72 h, further 48 h.

In the present disclosure, the secondary curing is conducted at 20° C. to 30° C., further 25° C. and a relative humidity of 80% to 90%, further 90% for 7 d to 90 d, such as 14 d, 28 d, 60 d, and 90 d.

To avoid redundant description, in the following examples of the present disclosure, the mucky cohesive soil (undisturbed soil) is obtained by the following steps: for mucky cohesive soil stratum, conducting drilling and collecting soil in situ using a long auger drill, to obtain the mucky cohesive soil. The mucky cohesive soil has a water content of 42.8%, a compressibility coefficient of 0.78 MPa, and a compressive modulus of 2.90 MPa.

Example 1

Screening of different anti-adhesion water reducers: anti-adhesion water reducers compounded by different inorganic salts and ASP were added to undisturbed soil (at 3% of the undisturbed soil), and a slurry outflow time of each sample was determined. A dispersing effect of different anti-adhesion water reducers on the slurry was considered by testing the slurry outflow time, and the results were shown in Table 1.

TABLE 1

Performance test results of different anti-adhesion water reducers

| Groups | Anti-adhesion water reducer | Slurry outflow time/s |
| --- | --- | --- |
| Group 1 | ASP + sodium silicate (1:2) | 54.96 |
| Group 2 | ASP + sodium hexametaphosphate (1:2) | 68.40 |
| Group 3 | ASP + sodium carbonate (1:2) | No fluidity |
| Group 4 | ASP + sodium pyrophosphate (1:2) | 46.30 |

It was seen from Table 1 that the anti-adhesion water reducer compounded by the sodium pyrophosphate and the ASP at a weight ratio of 2:1 could significantly improve the fluidity of the mucky cohesive soil slurry, and could ultimately help to improve the strength of the prepared fluidized solidified soil.

Example 2

Performance test of different dispersants for premixed fluidized solidified soil:

(1) Different dispersants were formulated according to a formula in Table 1. The anti-adhesion water reducer was compounded by sodium pyrophosphate and ASP at a weight ratio of 2:1; the stabilizer was a phosphite.

TABLE 2

Composition of different dispersants

| Groups | Anti-adhesion water reducer (part) | Stabilizer (part) | Water (part) |
| --- | --- | --- | --- |
| Group 5 | 6 | 0.6 | 93.4 |
| Group 6 | 7.5 | 0.6 | 91.9 |
| Group 7 | 9 | 0.6 | 90.4 |
| Group 8 | 10.5 | 0.6 | 88.9 |
| Group 9 | 12 | 0.6 | 87.4 |
| Group 10 | / | / | 100 |

(2) An improved mucky cohesive soil slurry was separately prepared with the different dispersants in Groups 5 to 10 or pure water. The different dispersants or the pure water was poured into a mixing bucket pre-filled with mucky cohesive soil (the dispersants or the pure water was used at 6% of the mucky cohesive soil). A stirring device was started; an initial stirring rate was set to 100 r/min, until the stirring rate increased to 120 r/min. Stirring was conducted for 10 min to obtain the improved mucky cohesive soil slurry. Table 3 showed a slurry outflow time for each of the improved mucky cohesive soil slurry prepared by different dispersants or pure water.

TABLE 3

Performance test results of improved mucky cohesive soil slurry

| Groups | Slurry outflow time/s |
| --- | --- |
| Group 5 | 51.33 |
| Group 6 | 47.62 |
| Group 7 | 42.56 |
| Group 8 | 46.53 |
| Group 9 | 50.26 |
| Group 10 | 72.24 |

It was seen from Table 3 that the mucky cohesive soil slurry prepared using the dispersant for mucky cohesive soil obtained by the present disclosure all exhibited a desirable dispersion effect.

(3) The different dispersants in Groups 5 to 10 or pure water was used in the mucky cohesive soil slurry. A soil solidifying agent accounting for 20 mass % of the improved mucky cohesive soil slurry was added into the improved mucky cohesive soil slurry. The premixed fluidized solidified soil was prepared under the joint action of the solidifying agent. The premixed fluidized solidified soil prepared by different dispersants and pure water was injected into a mold, and standard curing was conducted in a curing room at 25° C. and a relative humidity of 90% for 48 h before demolding. The curing was continued for 14 d, 28 d, 60 d, and 90 d to determine an unconfined compressive strength of the samples in each group, and the results were shown in Table 4.

TABLE 4

Performance test results of samples prepared by different dispersants under different curing times

| Curing day | Proportion of solidifying agent | | | | | |
| --- | --- | --- | --- | --- | --- | --- |
| | Group 5 | Group 6 | Group 7 | Group 8 | Group 9 | Group 10 |
| 14 d | 579.33 | 596.26 | 642.73 | 613.73 | 584.26 | 410.27 |
| 28 d | 1542.14 | 1658.79 | 1780.46 | 1620.37 | 1567.38 | 1160.48 |
| 60 d | 2456.79 | 2670.93 | 2759.34 | 2653.21 | 2539.47 | 2087.60 |
| 90 d | 4691.52 | 4785.21 | 4978.51 | 4850.33 | 4739.40 | 4178.46 |

It was seen from Table 4 that the unconfined compressive strength of the premixed fluidized solidified soil prepared using the dispersant for mucky cohesive soil obtained in the present disclosure met the pouring requirements of the fluidized solidified soil.

The foregoing descriptions are implementation manners of the present disclosure, but are not intended to limit the protection scope of the present disclosure. Any changes and modifications made according to the technical idea of the present disclosure shall fall within the protection scope of the claims of the present disclosure.

What is claimed is:

1. A dispersant for premixed fluidized solidified soil, comprising the following raw materials in parts by weight: 5 parts to 15 parts of an anti-adhesion water reducer, 0.5 parts to 0.8 parts of a stabilizer, and 85 parts to 95 parts of water; wherein the anti-adhesion water reducer is compounded by sodium pyrophosphate and an aminosulfonic acid-based superplasticizer (ASP) at a weight ratio of 2:1.

2. The dispersant according to claim 1, wherein the stabilizer is a phosphite.

3. The dispersant according to claim 1, comprising the following raw materials in parts by weight: 6 parts to 12 parts of the anti-adhesion water reducer, 0.6 parts of the stabilizer, and 87.4 parts to 93.4 parts of the water.

4. The dispersant according to claim 1, comprising the following raw materials in parts by weight: 7.5 parts to 10.5 parts of the anti-adhesion water reducer, 0.6 parts of the stabilizer, and 88.9 parts to 91.9 parts of the water.

5. The dispersant according to claim 1, comprising the following raw materials in parts by weight: 9 parts of the anti-adhesion water reducer, 0.6 parts of the stabilizer, and 90.4 parts of the water.

6. A preparation method of the dispersant for premixed fluidized solidified soil according to claim 1, comprising the following steps: mixing the anti-adhesion water reducer, the stabilizer, and the water uniformly to obtain the dispersant for premixed fluidized solidified soil.

* * * * *